W. M. BUTLER.
DRIVE CHAIN.
APPLICATION FILED MAR. 17, 1908.

913,618.

Patented Feb. 23, 1909.

Witnesses:
H. L. Sprague
H. W. Bowen

Inventor;
Wm. M. Butler.
by Chapin & Co.
Attorneys.

UNITED STATES PATENT OFFICE.

WILLIAM M. BUTLER, OF HARTFORD, CONNECTICUT, ASSIGNOR TO THE WHITNEY MANUFACTURING COMPANY, OF HARTFORD, CONNECTICUT, A CORPORATION.

DRIVE-CHAIN.

No. 913,618.      Specification of Letters Patent.      Patented Feb. 23, 1909.

Application filed March 17, 1908. Serial No. 421,678.

To all whom it may concern:

Be it known that I, WILLIAM M. BUTLER, a citizen of the United States of America, residing at Hartford, in the county of Hartford and State of Connecticut, have invented new and useful Improvements in Drive-Chains, of which the following is a specification.

This invention relates to improvements in drive-chains and particularly to the style of chains as used on bicycles or motor cycles.

The objects of my present invention are to construct a chain in which the pins or pivot portions are securely and firmly retained in the link or block part of the chain and against any possible danger of rotation or longitudinal movement; a further object being to so construct the chain that the ends of the pins or pivot portions thereof will not project to any appreciable extent beyond the outer surface of the links, whereby a chain can be constructed for use in spaces that are very narrow and where the projecting ends of the pins would be an objection, as will more fully appear in the body of the specification and particularly pointed out in the claims.

Figure 1:
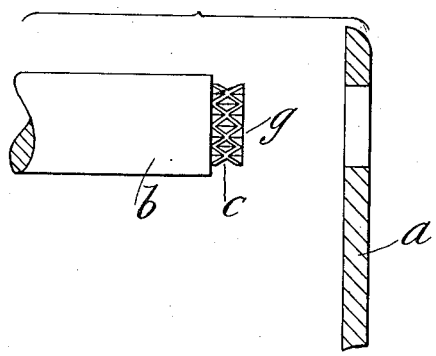
Figure 2:
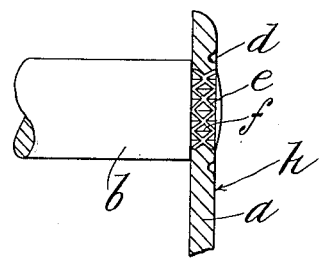

In the drawings forming part of this application,—Figure 1 is a detail view showing the manner of roughening or indenting the shouldered end of the pin before assembling the same in the opening in the side plate or block. Fig. 2 shows the manner of securing the pin to the link after assembling, the end of the pin being substantially flush with the outer surface of the link.

Referring to the drawings in detail, a designates the link or block part of the chain in the several views; b the pin in Figs. 1 and 2, in which the shouldered portion c is roughened or indented by any suitable or well known means. The shouldered and roughened or indented portion c of the pin is so formed that the ridges and cavities do not extend in a longitudinal direction, whereby when the metal of the link is forced laterally, by means of a press, against the roughened shouldered portion c of the pin, as shown by the annular ring d, the pin is effectually retained against lateral withdrawal, as well as any rotary movement. The angularly disposed ridges e and the cups f will therefore prevent longitudinal withdrawal of the pin since, as stated, the metal of the link is firmly forced against the shouldered portion. This construction enables me to make the end g of the pin substantially flush with the outer surface h of the links and permitting the length of the pin, and consequently the width of the chain, to be very much decreased, which is not possible with the usual or ordinary constructions now in use.

My invention, as described above, in connection with Figs. 1 and 2, therefore effectively and cheaply accomplishes the objects and purposes set forth in the statement of the invention.

What I claim, is:—

1. The combination with the link or block of a drive-chain, of a pin, the reduced portion of which is indented or roughened, whereby, when the metal of the link is forced laterally against said roughened portion, the pin is restrained from rotary and longitudinal movement.

2. A drive-chain comprising a link or block, and a pin, the reduced end portion of which is provided with angularly disposed ridges and cavities and substantially equal in length to the thickness of the link, whereby when the metal of the link is laterally forced against the roughened portion the pin is locked against rotary and longitudinal movement and the end of the pin and outer surface of the link are flush.

WILLIAM M. BUTLER.

Witnesses:
    JAS. W. GREEN,
    W. W. TOTMAN.